US010132232B2

(12) United States Patent
Kondo et al.

(10) Patent No.: US 10,132,232 B2
(45) Date of Patent: Nov. 20, 2018

(54) SUPERCHARGING DEVICE FOR ENGINE

(71) Applicant: MAZDA MOTOR CORPORATION, Hiroshima (JP)

(72) Inventors: Hidenari Kondo, Higashihiroshima (JP); Manabu Sugimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 186 days.

(21) Appl. No.: 15/412,577

(22) Filed: Jan. 23, 2017

(65) Prior Publication Data

US 2017/0234209 A1 Aug. 17, 2017

(30) Foreign Application Priority Data

Feb. 12, 2016 (JP) .................................. 2016-024868

(51) Int. Cl.
*F02B 37/04* (2006.01)
*F02B 29/04* (2006.01)
(Continued)

(52) U.S. Cl.
CPC ............ *F02B 37/04* (2013.01); *F02B 29/045* (2013.01); *F02B 37/013* (2013.01);
(Continued)

(58) Field of Classification Search
CPC ...... F02B 37/04; F02B 29/045; F02B 37/013; F02B 37/16; F02B 37/127; F02B 75/20;
(Continued)

(56) References Cited

U.S. PATENT DOCUMENTS

| 2008/0011278 A1* | 1/2008 | Yamagata | ............... F02D 23/00 123/562 |
| 2008/0047525 A1* | 2/2008 | Morizane | ............... F02B 37/04 123/344 |

(Continued)

FOREIGN PATENT DOCUMENTS

| JP | H07-25243 U | 5/1995 |
| JP | H08-268336 A | 10/1996 |

(Continued)

OTHER PUBLICATIONS

An Office Action; "Notification of Reasons for Refusal," mailed by the Japanese Patent Office dated Jan. 9, 2018, which corresponds to Japanese Patent Application No. 2016-024868 and is related to U.S. Appl. No. 15/412,577; with English language translation.

*Primary Examiner* — Hoang Nguyen
(74) *Attorney, Agent, or Firm* — Studebaker & Brackett PC

(57) ABSTRACT

A supercharging device for an engine includes an electric supercharger which supercharges intake air, an intercooler which cools intake air discharged from the electric supercharger; and an intake manifold which is disposed substantially horizontally, and is configured to communicate between a downstream end of the intercooler in an intake air flow direction, and intake ports. The downstream end of the intercooler is located on a lower end of the intercooler. The downstream end of the intercooler is disposed substantially at the same height as an upstream end of the intake ports. The electric supercharger is disposed below the intercooler along a surface of the engine on an intake side where the intake ports are opened.

7 Claims, 10 Drawing Sheets

(51) Int. Cl.
 *F02B 75/20* (2006.01)
 *F02B 37/013* (2006.01)
 *F02B 37/12* (2006.01)
 *F02B 37/16* (2006.01)
 *F02B 75/18* (2006.01)

(52) U.S. Cl.
 CPC ............ *F02B 37/127* (2013.01); *F02B 37/16* (2013.01); *F02B 75/20* (2013.01); *F02B 2075/1816* (2013.01); *Y02T 10/144* (2013.01); *Y02T 10/146* (2013.01)

(58) Field of Classification Search
 CPC ........... F02B 2075/1816; Y02T 10/144; Y02T 10/146
 USPC .................................................. 60/598–612
 See application file for complete search history.

(56) References Cited

U.S. PATENT DOCUMENTS

2013/0255251 A1* 10/2013 Tanaka .................... F02B 39/10
 60/605.2
2016/0024997 A1* 1/2016 Buschur ................. F02B 37/10
 60/607

FOREIGN PATENT DOCUMENTS

| | | |
|---|---|---|
| JP | 2002-337739 A | 11/2002 |
| JP | 2006-220124 A | 8/2006 |
| JP | 2006-348831 A | 12/2006 |
| JP | 2013-148062 A | 8/2013 |
| JP | 2016-191304 A | 11/2016 |
| WO | 2015/030006 A1 | 3/2015 |

* cited by examiner

SUPERCHARGING DEVICE FOR ENGINE

FIELD OF THE INVENTION

The present invention relates to a supercharging device for an engine, which enables to protect an electric supercharger from exhaust heat while preventing deposition of condensed water within an intercooler, and which is mountable around the engine in a compact manner.

BACKGROUND ART

Development on an engine with an electric supercharger, which includes an engine, a turbocharger which supercharges intake air by using exhaust energy of the engine, and an electric supercharger which compensates for the supercharging performance of the turbocharger when the engine is in a low speed range, has progressed. Japanese Unexamined Patent Publication No. 2006-220124 (hereinafter, referred to as Patent Literature) discloses an example of the aforementioned configuration.

An engine with an electric supercharger illustrated in FIG. 5 of Patent Literature includes an engine; an intake passage which introduces intake air into the engine; an exhaust passage which discharges exhaust air from the engine; a turbocharger including a turbine disposed on the exhaust passage, and a compressor disposed on the intake passage; an intercooler disposed on the downstream side of the compressor on the intake passage; a bypass passage which communicates between the intercooler and the compressor on the intake passage; and an electric supercharger disposed on the bypass passage.

When intake air whose temperature is increased by compression by a compressor is cooled by an intercooler, water condensation may occur within the intercooler. Although the positional relationship between an intercooler and an intake port of an engine in the up-down direction is not clear from the description of Patent Literature, when the intercooler is located on the lower side than the intake port, the following problem may occur. Specifically, when a state that the engine speed is low (e.g. an idling state) is continued for a long time, water droplets by water condensation may not be sucked into the engine, and condensed water may deposit within the intercooler. If the engine speed is rapidly increased in this state, a large amount of condensed water may be instantaneously sucked into the engine together with the air, and liquid compression may occur within the engine.

In order to solve the aforementioned drawback, for instance, there is an idea of disposing an intercooler on the upper side than a cylinder head of an engine. When the intercooler is disposed as described above, water droplets generated by water condensation are sucked into an engine immediately after generation of condensed water. This may make it difficult to cause deposition of condensed water within an intercooler, and may prevent liquid compression. In the aforementioned configuration, however, the position of the upper end of the intercooler is set high. This may increase the height of a hood.

Further, although the position of an electric supercharger with respect to an engine is not clear from the description of Patent Literature, when the electric supercharger is disposed on the exhaust side of the engine, the electric supercharger may cause an operation failure by exhaust heat because the heat resistance of a motor in the electric supercharger is low.

Further, in recent years, in a family vehicle, there is a demand for downsizing i.e. reducing the size and the weight of a vehicle while securing a high output with a compact engine for improving the fuel economy. Therefore, there is a demand for miniaturizing an engine with an electric supercharger.

SUMMARY OF THE INVENTION

In view of the above, an object of the present invention is to provide a supercharging device for an engine, which enables to protect an electric supercharger from exhaust heat while preventing deposition of condensed water within an intercooler, and which is mountable around the engine in a compact manner.

An aspect of the present invention is directed to a supercharging device for an engine including a cylinder head with intake ports. The supercharging device includes an electric supercharger which supercharges intake air to the engine; an intercooler which cools intake air discharged from the electric supercharger; and an intake manifold which is disposed substantially horizontally, and is configured to communicate between a downstream end of the intercooler in an intake air flow direction, and the intake ports. The downstream end of the intercooler is located on a lower end of the intercooler, and the downstream end of the intercooler is disposed substantially at a same height as an upstream end of the intake ports. The electric supercharger is disposed below the intercooler along a surface of the engine on an intake side where the intake ports are opened.

These and other objects, features and advantages of the present invention will become more apparent upon reading the following detailed description along with the accompanying drawings.

DESCRIPTION OF EMBODIMENTS

In the following, a preferred embodiment of the present invention is described in detail referring to the accompanying drawings.

Configuration of Engine

Figure 1:
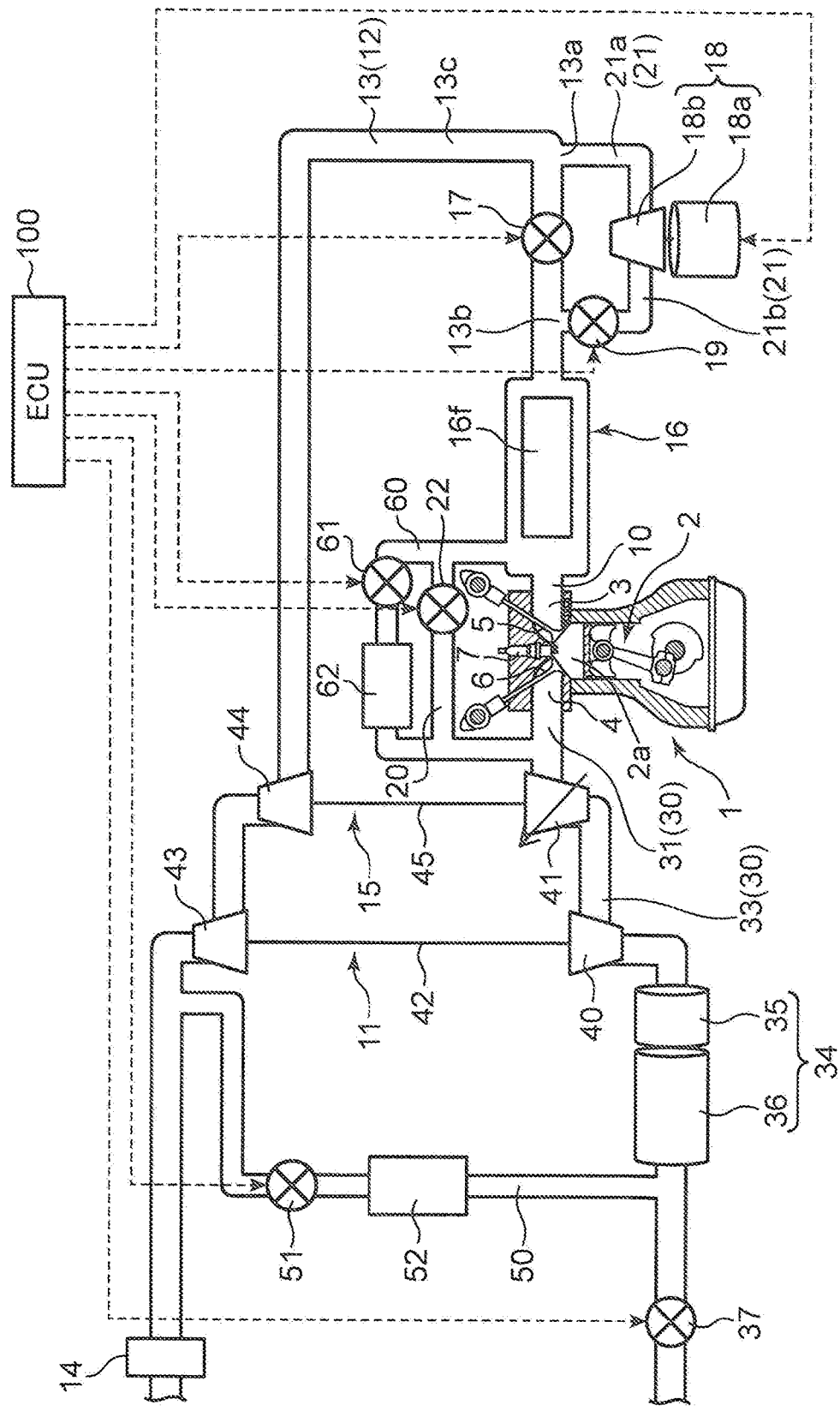
FIG. 1 is a schematic diagram illustrating an overall structure of an engine provided with a supercharging device according to an embodiment of the present invention.

An engine 1 (see FIG. 1 to FIG. 3) to which a supercharging device according to an embodiment is applied is a vehicular engine for an automobile or the like. The engine 1 is a longitudinally mounted in-line 4-cylinder diesel engine, which is configured in such a manner that the cylinder array direction is aligned with a vehicle front-rear direction within an engine room of a vehicle front portion. The engine 1 includes intake ports 3 on the vehicle left side, and includes exhaust ports 4 on the vehicle right side. Note that FIG. 1 illustrates only one cylinder 2 out of four cylinders 2 i.e. the first to fourth cylinders 2 aligned from one side to the other side in the cylinder array direction.

Figure 2:
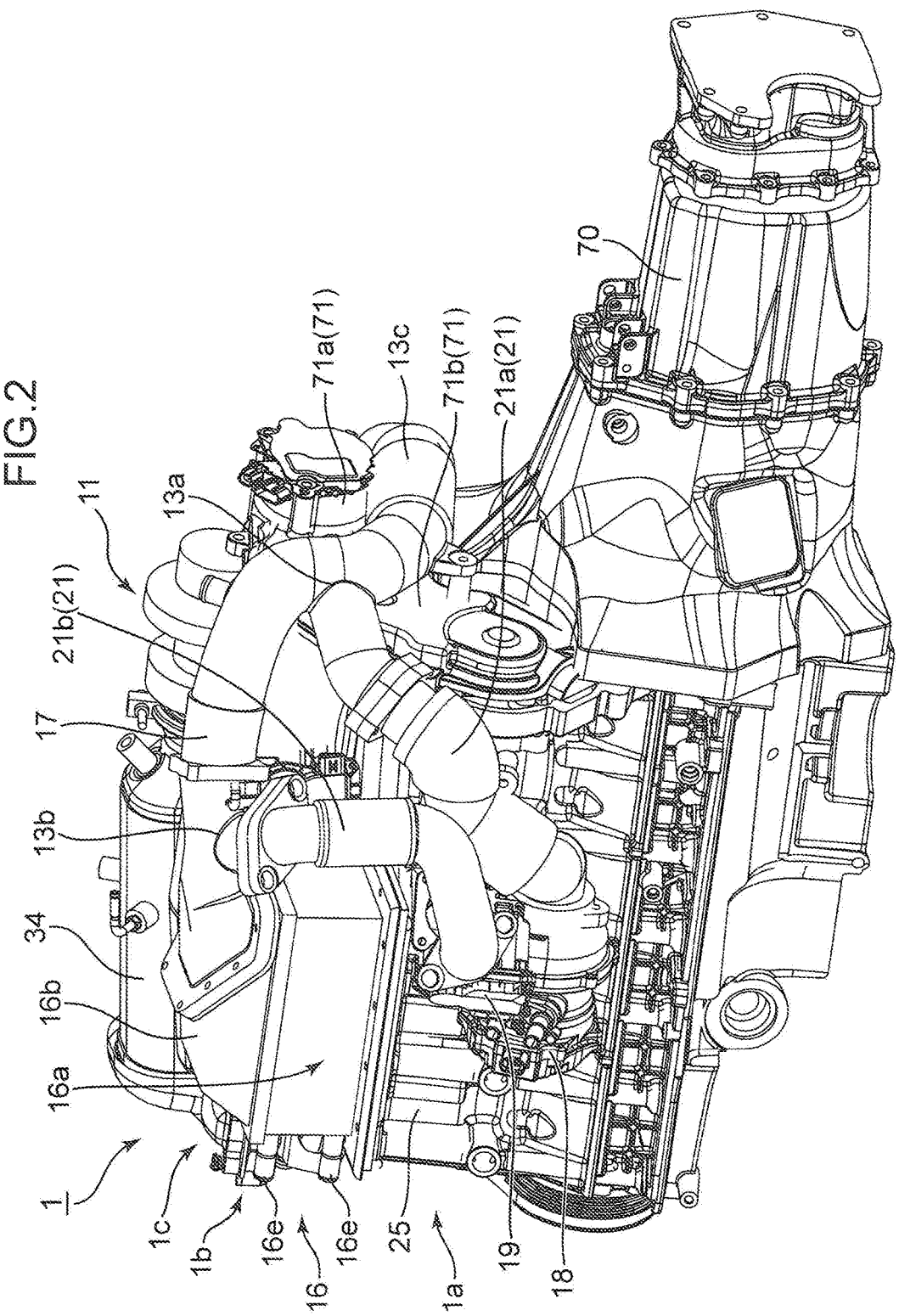
FIG. 2 is a perspective view illustrating the engine.

As illustrated in FIG. 2, the engine 1 includes a cylinder block 1a, a cylinder head 1b disposed on the upper side of the cylinder block 1a, a cylinder head cover 1c disposed on the upper side of the cylinder head 1b, a power transmission mechanism (not illustrated) disposed on one end of the cylinder block 1a and the cylinder head 1b in the cylinder array direction, and configured to transmit a rotational force of a crankshaft to an intake valve drive shaft and to an exhaust valve drive shaft, and a cover member 71 which covers the power transmission mechanism. A transmission 70 which converts the number of rotations of the engine 1 to an appropriate number of rotations is mounted below the cover member 71.

The power transmission mechanism includes a crank sprocket mounted on the crankshaft, an intake sprocket mounted on the intake valve drive shaft, an exhaust sprocket mounted on the exhaust valve drive shaft, a timing chain wound around the crank sprocket, the intake sprocket and the exhaust sprocket, and an exhaust variable valve timing mechanism (hereinafter, referred to as an exhaust VVT) which changes opening and closing timings of an exhaust valve.

As illustrated in FIG. 2, the cover member 71 includes an exhaust VVT cover portion 71a which covers the exhaust VVT, and a chain cover portion 71b which covers the timing chain and the like. The exhaust VVT cover portion 71a is projected to one side of the engine 1 in the cylinder array direction, namely, to the rear side of the engine 1 in the vehicle front-rear direction, from the chain cover portion 71b.

As illustrated in FIG. 1, a combustion chamber 2a is formed in each of the cylinders 2 of the engine 1. The intake port 3 and the exhaust port 4 are opened in each of the combustion chambers 2a. An intake valve 5 is provided for each of the intake ports 3, and an exhaust valve 6 is provided for each of the exhaust ports 4. Further, a fuel injection valve 7 is provided at an upper portion of each of the combustion chambers 2a.

Figure 4:
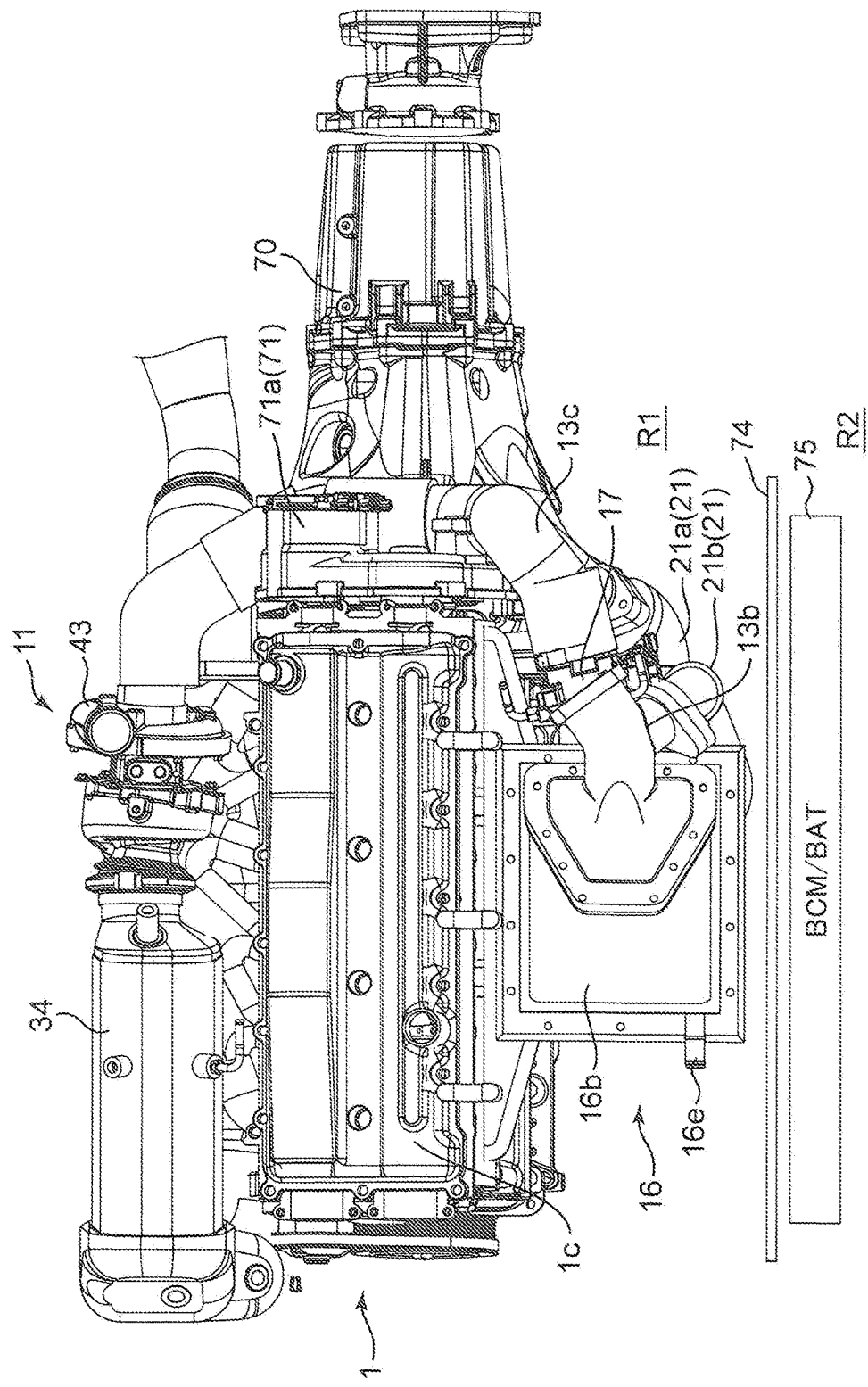
FIG. 4 is a plan view illustrating the engine.

As illustrated in FIG. 4, a partition wall 74 extends in the vehicle front-rear direction within the engine room for separating the inside of the engine room into a region R1 where the engine 1 and a supercharging device are disposed, and a region R2 where a vehicle-mounted electrical component 75 such as a BCM (body control module) or a battery is disposed.

Configuration of Supercharging Device

A supercharging device according to the embodiment is a device for use with the engine 1. The supercharging device is provided in an intake passage 12 which supplies fresh air (intake air) to each of the cylinders 2 of the engine 1, and in an exhaust passage 30 which discharges exhaust gas from each of the cylinders 2.

The supercharging device according to the embodiment schematically includes first and second exhaust turbochargers 11 and 15 to be driven by exhaust energy of the engine 1, an electric supercharger 18 to be driven by electrical energy, an intercooler 16 which cools intake air discharged from the first and second exhaust turbochargers 11 and 15 and from the electric supercharger 18, and an intake manifold 10 which communicates between the downstream end of the intercooler 16 in the intake air flow direction and the intake ports 3 of the engine 1.

In the following, constituent elements of an engine system including the engine 1, the intake passage 12, the exhaust passage 30, and the supercharging device are described in detail.

As illustrated in FIG. 1, the intake passage 12 includes the intake manifold 10 to be connected to each of the intake ports 3, and a common intake passage 13 formed on the upstream side of the intake manifold 10 in the intake air flow direction. The intercooler 16 is interposed between the intake manifold 10 and the common intake passage 13.

Figure 5:
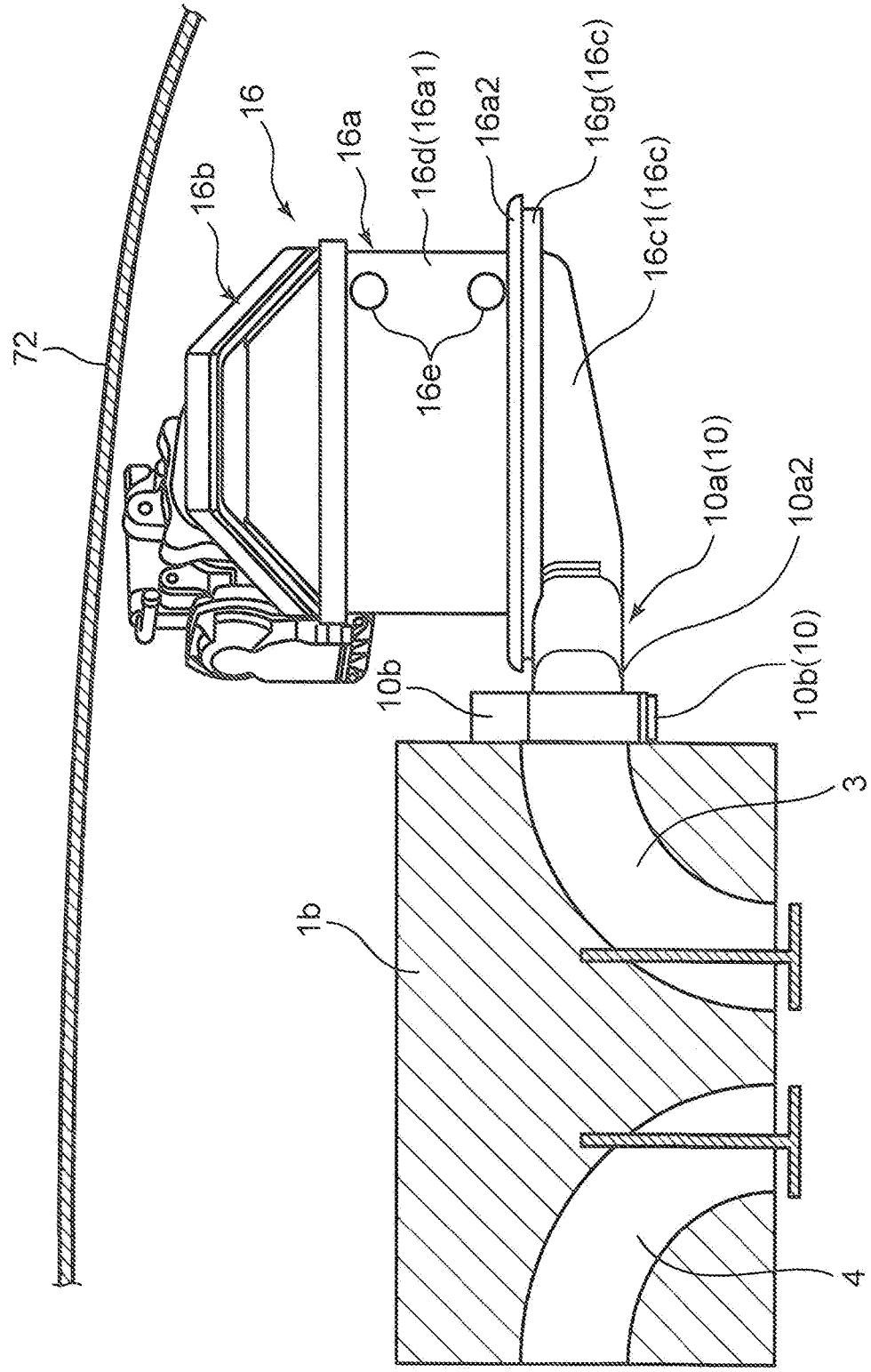
FIG. 5 is a side view of an intake manifold and an intercooler when viewed in the cylinder array direction.
Figure 6:
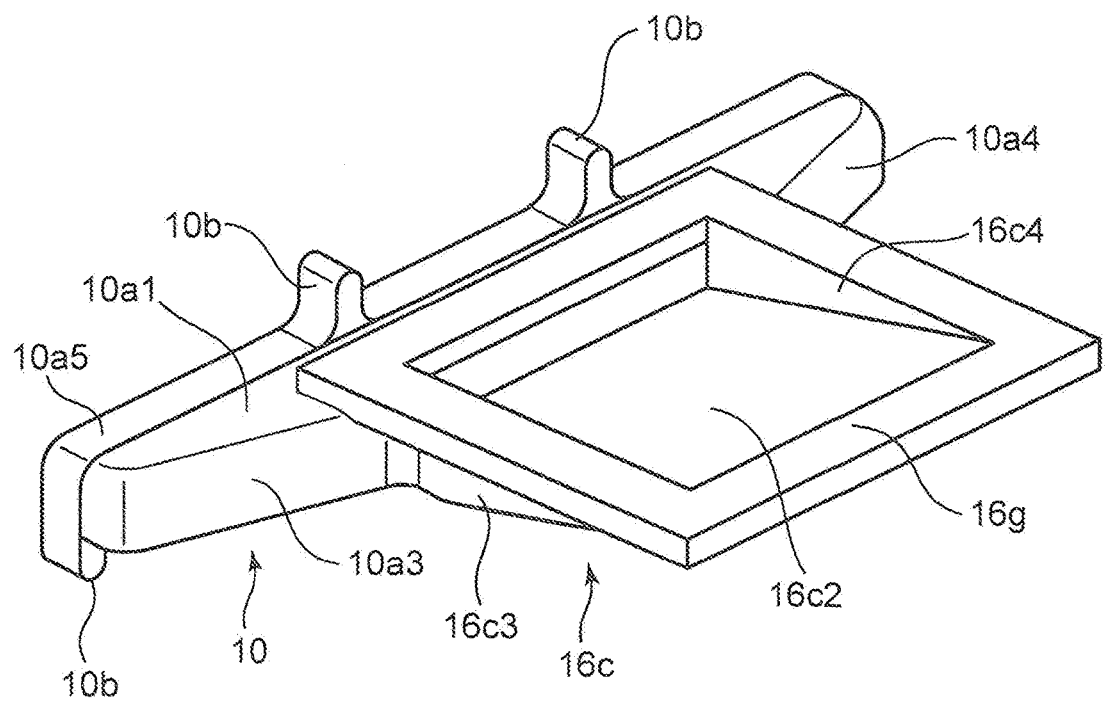
FIG. 6 is a perspective view illustrating the intake manifold and a surge tank of the intercooler.
Figure 7:
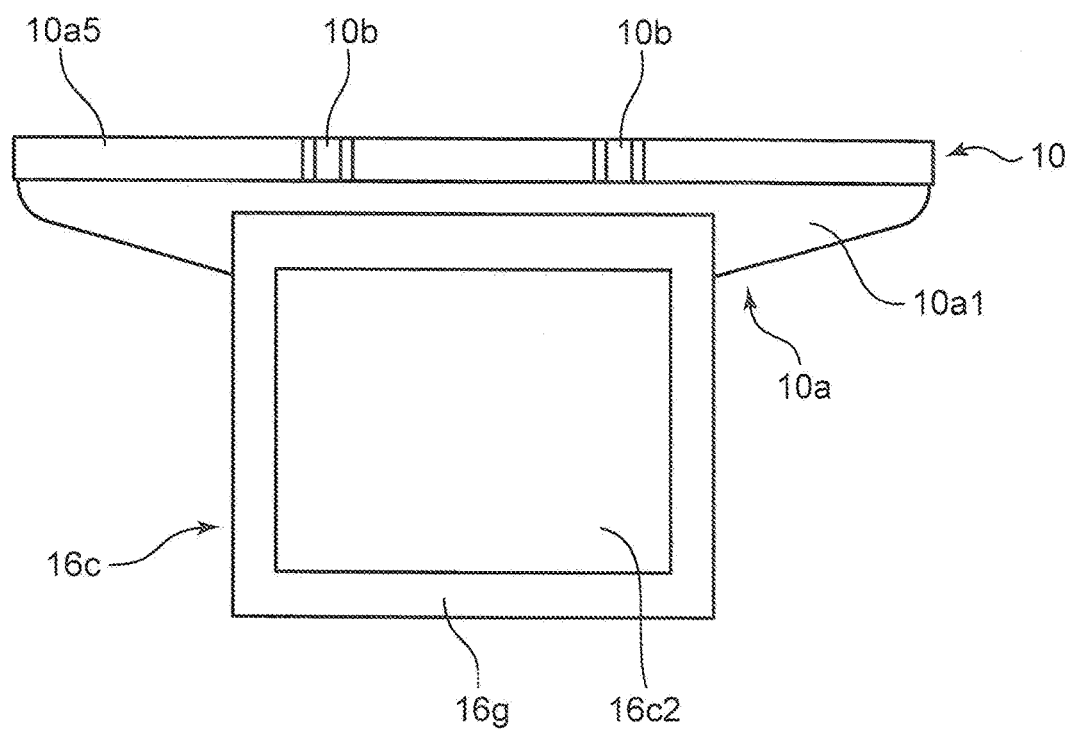
FIG. 7 is a plan view illustrating the intake manifold and the surge tank of the intercooler.
Figure 8:
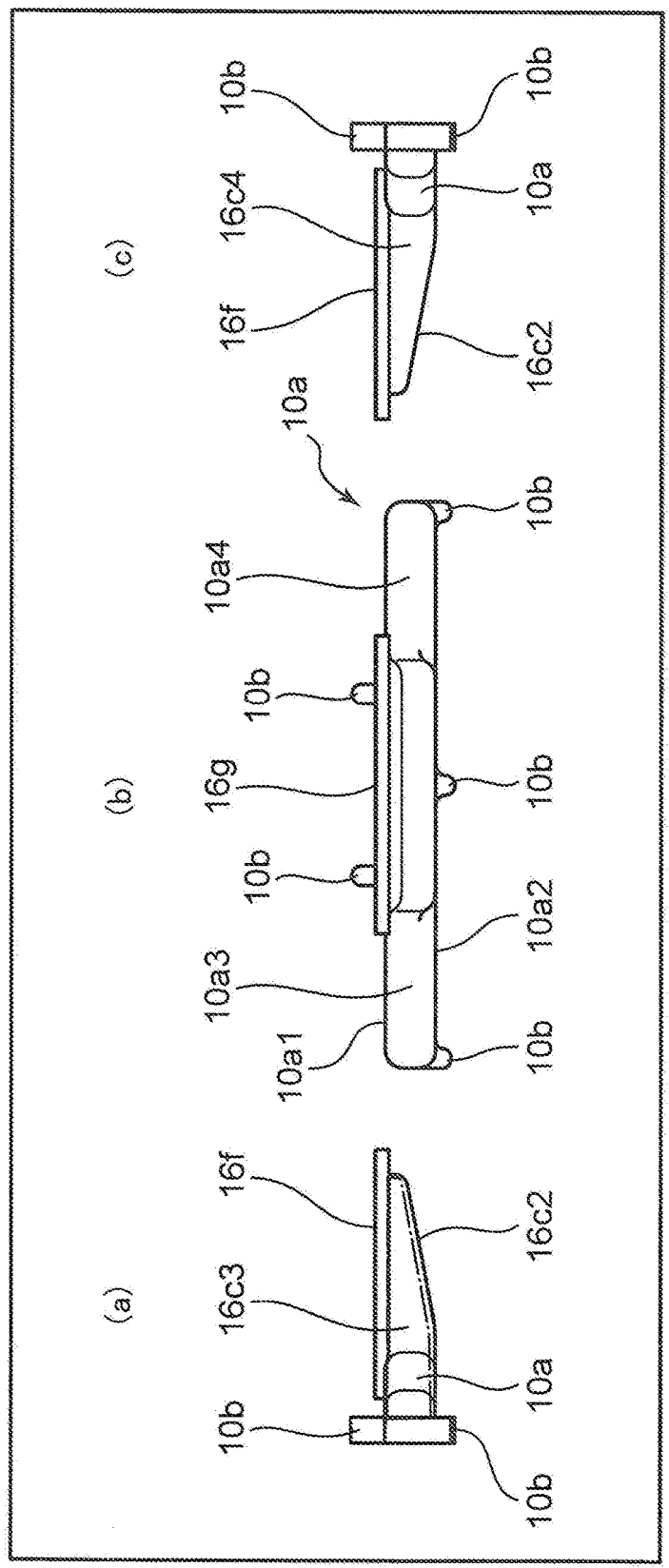
FIG. 8 is a side view illustrating the intake manifold and the surge tank of the intercooler when viewed from a direction orthogonal to the cylinder array direction.

As illustrated in FIG. 5, the intake manifold 10 extends substantially horizontally, and communicates between the downstream end of the intercooler 16 and the intake ports 3. As illustrated in FIG. 5 to FIG. 9, the intake manifold 10 includes a manifold body 10a which guides intake air to the intake ports 3, and a mounting flange 10b formed on the downstream end of the manifold body 10a and mounted on a surface of the cylinder head 1a on the intake side.

In the example illustrated in FIG. 5 to FIG. 9, the intake manifold body 10a is a hollow member of a trapezoidal shape in plan view. Specifically, the intake manifold body 10a is configured in such a manner that the width thereof is gradually increased in the cylinder array direction from the upstream end thereof to the downstream end thereof in plan view. The intake manifold body 10a includes a trapezoidal upper wall portion 10a1, a trapezoidal lower wall portion 10a2 spaced away from the upper wall portion 10a1 in the up-down direction while facing the upper wall portion 10a1, a first side wall portion 10a3 which connects between a slope of the upper wall portion 10a1 and a slope of the lower wall portion 10a2 in the up-down direction, a second side wall portion 10a4 which connects between another slope of the upper wall portion 10a1 and another slope of the lower wall portion 10a2 in the up-down direction, and an end wall portion 10a5 formed on the downstream end (an end of the intake manifold body 10a on the engine side).

Figure 9:
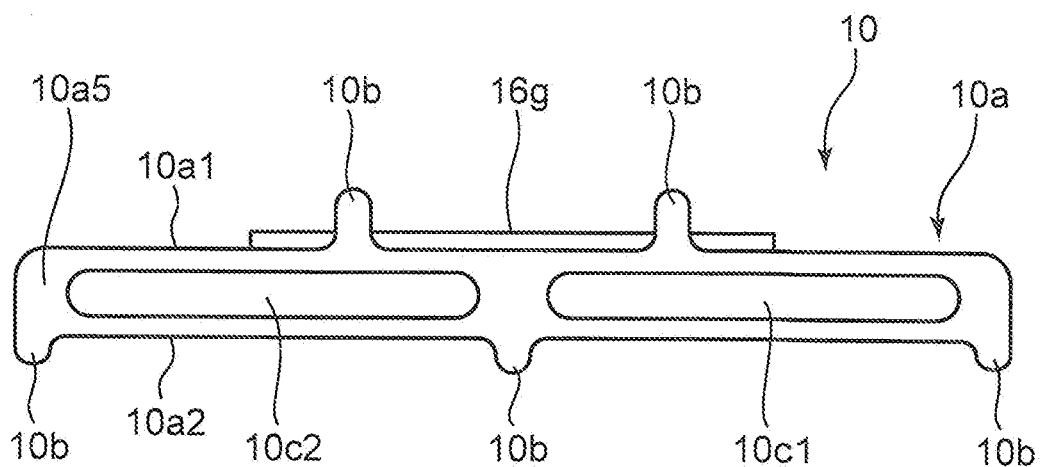
FIG. 9 is a side view of the intake manifold when viewed from the engine side.

As illustrated in FIG. 9, the end wall portion 10a5 includes a first opening portion 10c1 which communicates with the upstream end of the intake port 3 of each of the first cylinder and the second cylinder, and a second opening portion 10c2 which communicates with the upstream end of the intake port 3 of each of the third cylinder and the fourth cylinder.

The mounting flange 10b includes two upper flanges 10b which project upwardly from the upper surface of the downstream end (the end wall portion 10a5) of the manifold body 10a, and three lower flanges 10b, each of which projects downwardly from the lower surface of the downstream end (the end wall portion 10a5) of the manifold body 10a. A bolt insertion hole (not illustrated) is formed in each of the flanges 10b.

Figure 10:
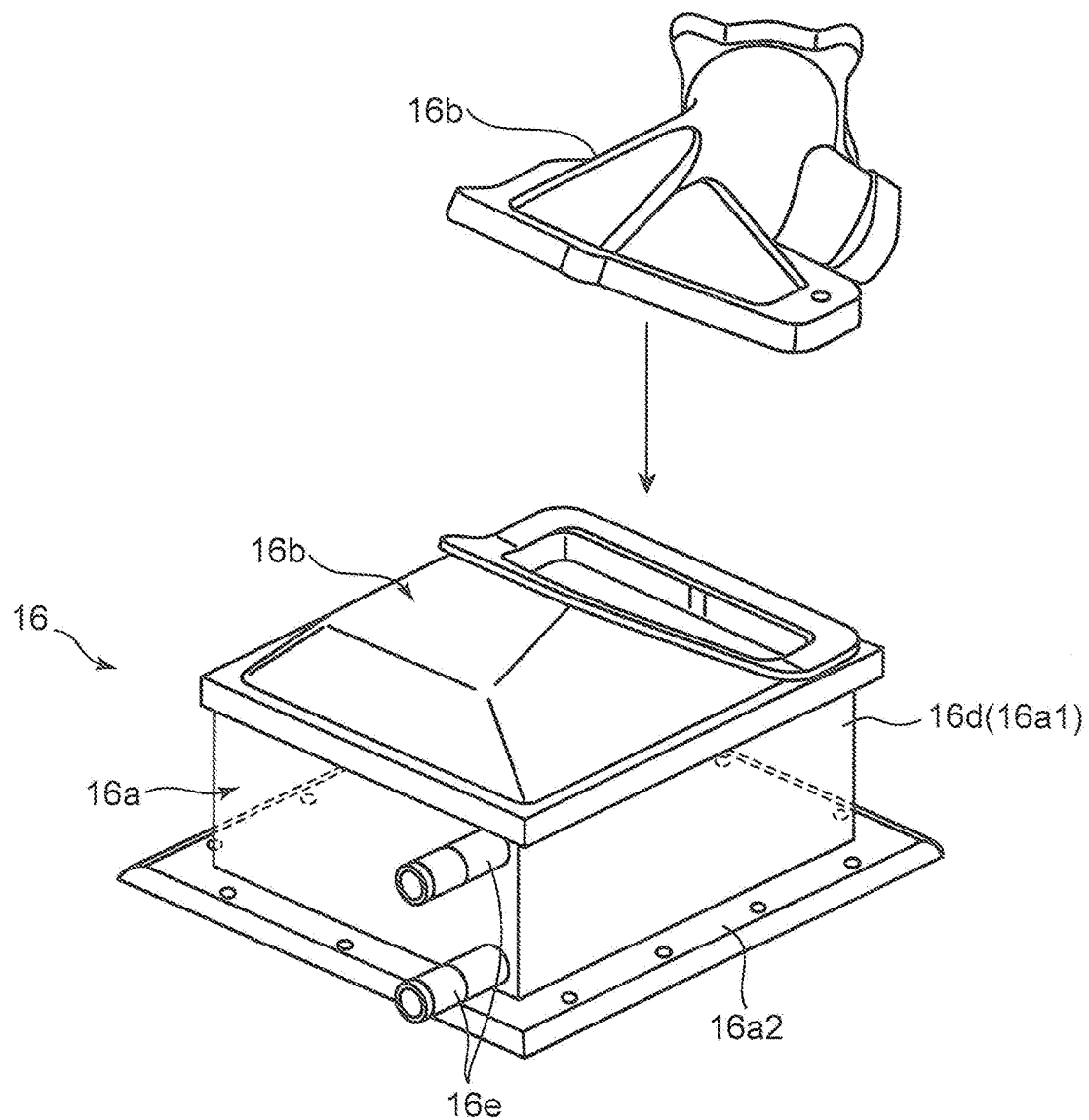
FIG. 10 is a perspective view illustrating an intercooler core.

As illustrated in FIG. 5 and FIG. 10, the intercooler 16 is a water-cooling intercooler. The intercooler 16 includes an intercooler core 16a, an upstream tank 16b formed on the upper side of the intercooler core 16a, and a downstream tank 16c formed on the lower side of the intercooler core 16a.

The intercooler core 16a includes an intercooler core body 16a1 with a housing 16d and a heat exchanger 16f (see FIG. 1) disposed within the housing 16d, and a core-side flange 16a2 formed on the lower end of the intercooler core body 16a1.

The housing 16d of the intercooler core body 16a1 is constituted by a side wall of a rectangular prismatic shape. An upper end and a lower end of the housing 16d is opened. The core-side flange 16a2 extends outwardly from the lower end of the housing 16d.

The heat exchanger 16f of the intercooler core body 16a1 includes a plurality of partition walls which separate (divide) the inside of the housing 16d into water passing regions and intake air passing regions, which are formed alternately in the cylinder array direction; and a cooling water pipe 16e which supplies cooling water to the water passing regions and discharges cooling water from the water passing regions. Intake air is cooled by heat exchange between intake air and cooling water through the partition walls.

The cooling water pipe 16e passes through the housing 16d from the outside of the housing 16d. Specifically, the cooling water pipe 16e passes through the lower portion and the upper portion of a side wall of the housing 16d. The cooling water pipe 16e passing through the lower portion of the side wall, and the cooling water pipe 16e passing through the upper portion of the side wall respectively extend in the cylinder array direction. Tip ends of the cooling water pipes 16e are joined into a U-shape within the housing 16d. FIG. 10 illustrates a portion of the cooling water pipe 16e, which is located on the outside of the housing 16d. The cooling water pipe 16e is connected to a radiator (not illustrated) for a supercharger. Cooling water cooled by the radiator is supplied to the water passing regions by the cooling water pipe 16e. Cooling water warmed within the water passing regions is returned to the radiator by the cooling water pipe 16e.

The intake air passing regions of the heat exchanger 16f communicate with the common intake passage 13 via the upstream tank 16b, and communicate with the intake manifold 10 via the downstream tank 16c. According to this configuration, intake air is allowed to flow from the upstream tank 16b into the intake air passing regions. Intake air flowing into the intake air passing regions is discharged to the downstream tank 16c.

The upstream tank 16b is a member which distributes intake air flowing from the common intake passage 13, and supplies the intake air to the intercooler core 16a. The sectional area of the intake air passing regions is gradually increased from the upstream end of the upstream tank 16b toward the downstream end of the upstream tank 16b.

The downstream tank 16c is a member which collects intake air cooled by the intercooler core 16a, and supplies the intake air to the intake manifold 10. In this example, the downstream tank 16c is integrally formed with the intake manifold 10.

The downstream tank 16c includes a downstream tank body 16c1, and a tank-side flange 16g formed on the upstream end of the downstream tank body 16c1, and engaged with the core-side flange 16a2 by a bolt.

The downstream tank body 16c1 is configured such that the upstream end thereof (i.e. an end of the downstream tank body 16c1 on the tank-side flange 16g side) is opened upwardly toward the intercooler core body 16a1, and the downstream end thereof is opened horizontally while communicating with the intake manifold 10. Specifically, the downstream tank body 16c1 includes a bottom plate portion 16c2 communicating with the lower wall portion 10a2 of the intake manifold 10, and extending obliquely upwardly from an end of the intercooler 16 on the intake manifold side toward an end thereof on the side opposite to the intake manifold 10; a first side wall portion 16c3 rising upward from an end of the bottom plate portion 16c2 in the cylinder array direction, and communicating with the first side wall portion 10a3 of the intake manifold 10; and a second side wall portion 16c4 rising upward from the other end of the bottom plate portion 16c2 in the cylinder array direction, and communicating with the second side wall portion 10a4 of the intake manifold 10. The downstream end of the intercooler 16 is disposed substantially at the same height as the upstream end of the intake ports 3. Specifically, the height of the lower end of the bottom plate portion 16c2 of the intercooler 16 (the end of the bottom plate portion 16c2 on the intake manifold side) is set substantially the same as the height of the lower wall portion 10a2 of the intake manifold body 10a, and as the height of the lower end of the upstream end of the intake ports 3 (see FIG. 5).

As illustrated in FIG. 1, the common intake passage 13 includes, in this order from the upstream side in the intake air flow direction, an air cleaner 14, a compressor wheel 43 (hereinafter, referred to as a first compressor 43) of the first exhaust turbocharger 11, a compressor wheel 44 (hereinafter, referred to as a second compressor 44) of the second exhaust turbocharger 15, and a first flow rate regulator valve (a throttle valve) 17. The first exhaust turbocharger 11 and the second exhaust turbocharger 15 correspond to a turbocharger of the present invention. The first compressor 43 and the second compressor 44 correspond to a compressor of the present invention. A portion of the common intake passage 13 between the first compressor 43 and the intercooler 16 corresponds to a main intake pipe of the present invention. In the following description, the aforementioned portion of the common intake passage 13 is referred to as a main intake pipe 13c.

Figure 3:
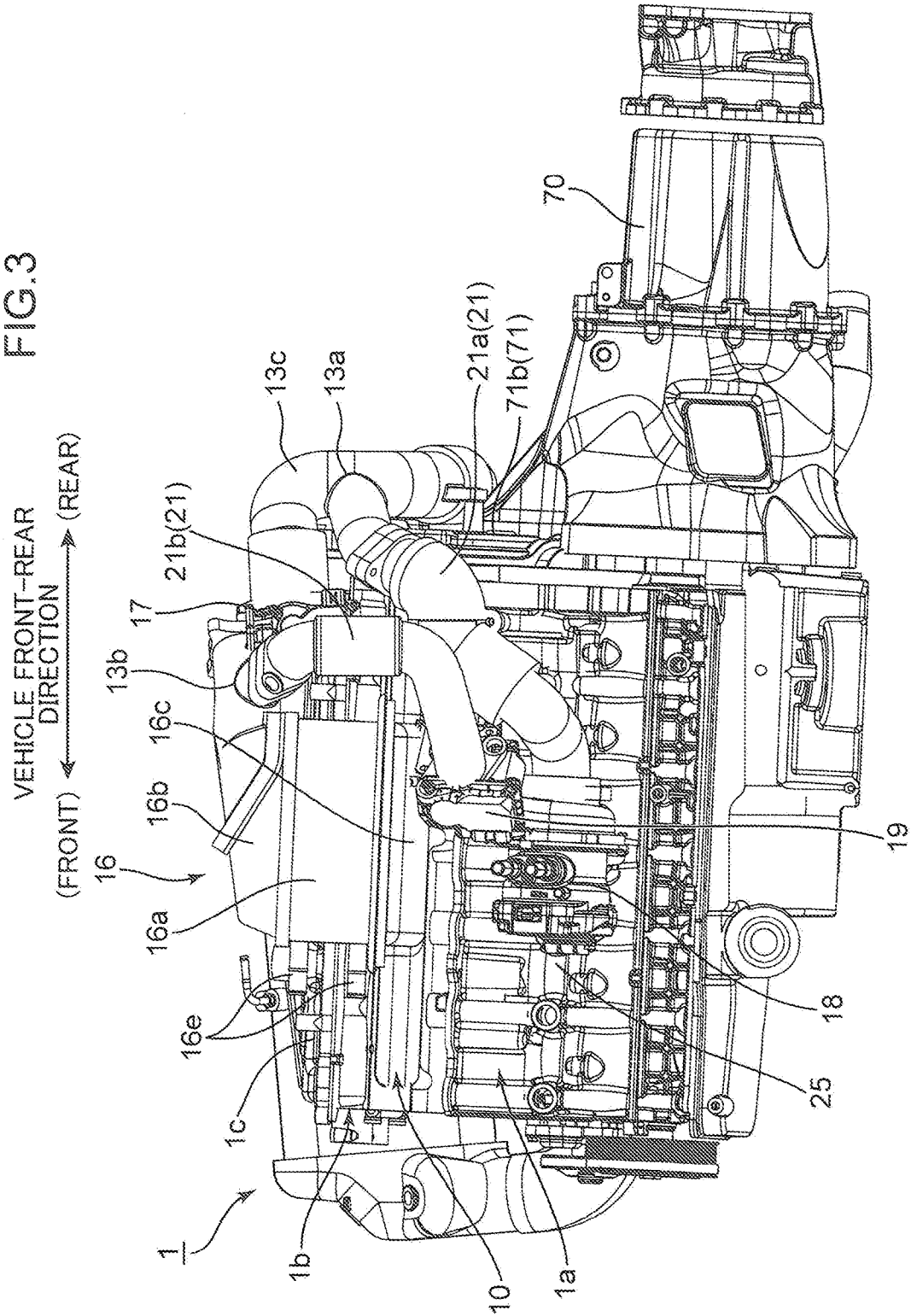
FIG. 3 is a side view of the engine when viewed from the intake side.

The main intake pipe 13c extends from the first compressor 43 of the first exhaust turbocharger 11, passes the second compressor 44 of the second exhaust turbocharger 15, and as illustrated in FIG. 2 and FIG. 4, extends to a surface of an end of the engine 1 in the cylinder array direction (the rear end of the engine 1 in the vehicle front-rear direction). More specifically, the main intake pipe 13c extends from the exhaust side of the engine 1 toward the intake side along the chain cover portion 71b at a position below the exhaust VVT cover portion 71a, and further extends toward the intercooler 16 along a surface 25 of the engine 1 on the intake side. As illustrated in FIG. 2 and FIG. 3, the main intake pipe 13c extends from the exhaust side of the engine 1 toward the intake side of the engine 1 upwardly toward the intercooler 16.

As illustrated in FIG. 1, the first flow rate regulator valve 17 for regulating the flow rate of intake air to be introduced to the intake ports 3 through the main intake pipe 13c is disposed on the downstream side of the second compressor 44 on the the main intake pipe 13c. Further, an electric supercharger bypass passage 21 which bypasses the first flow rate regulator valve 17 is connected to the downstream portion of the second compressor 44. The electric supercharger bypass passage 21 corresponds to a branch intake pipe of the present invention.

More specifically, the electric supercharger bypass passage 21 is a passage formed in parallel to the common intake passage 13 on the downstream side of the second compressor 44, and is a passage which communicates between a first position 13a and a second position 13b of the common intake passage 13 away from each other in the intake air flow direction. The second position 13b is located on the downstream side of the first position 13a. As illustrated in FIG. 2 and FIG. 3, the electric supercharger bypass passage 21 is branched downward from the first position 13a at a midway of the main intake pipe 13c, and is disposed along a surface of the engine 1 on the intake side.

The electric supercharger 18, and a second flow rate regulator valve 19 for regulating the flow rate of intake air to be introduced to the intake ports 3 through the electric supercharger bypass passage 21 are disposed on the electric supercharger bypass passage 21 in this order from the upstream side in the intake air flow direction. In this example, the first position 13a is set in the vicinity of the end of the engine 1 in the cylinder array direction (the rear end of the engine 1 in the vehicle front-rear direction) on the main intake pipe 13c. Specifically, the first position 13a is set at a portion of the main intake pipe 13c extending upwardly from the end of the engine 1 in the cylinder array direction toward the intercooler 16. Further, the first flow rate regulator valve 17 is disposed at a position between the first position 13a and the second position 13b. The first flow rate regulator valve 17 and the second flow rate regulator valve 19 are controllably opened and closed by an ECU (Electronic Control Unit) 100 to be described later.

Note that the reference numeral 21a illustrated in FIG. 1 to FIG. 3 denotes the upstream portion of the electric supercharger bypass passage 21 with respect to the electric supercharger 18, and the reference numeral 21b denotes the downstream portion of the electric supercharger bypass passage 21 with respect to the electric supercharger 18.

The electric supercharger 18 includes an electric motor 18a, and an impeller 18b to be directly driven by the electric motor 18a. The electric supercharger 18 is driven by the electric motor 18a. Therefore, the electric supercharger 18 has good responsiveness, and is capable of speedily increasing a supercharging pressure. Further, the electric supercharger 18 is capable of increasing a supercharging pressure without being affected by an operating state of the engine 1 (such as an engine speed). Taking advantage of the aforementioned characteristics, the electric supercharger 18 is driven to compensate for a supercharging operation until the supercharging pressures of the first and second exhaust turbochargers 11 and 15 are increased in a condition that the engine 1 is in a low speed range, or in a condition that the first and second exhaust turbochargers 11 and 15 cannot perform a supercharging operation due to turbo lag, in which a supercharging operation is delayed.

As illustrated in FIG. 3, the electric supercharger 18 is disposed below the intake manifold 10 and the intercooler 16 along a surface 25 of the engine 1 where the intake ports 3 (see FIG. 1) are formed. Further, the second flow rate regulator valve 19 is disposed on the electric supercharger bypass passage 21 at a position above the electric supercharger 18 and below the intercooler 16. Note that an operation of the electric supercharger 18 is controlled by the ECU 100.

As illustrated in FIG. 1, the exhaust passage 30 includes an exhaust manifold 31 and a common exhaust passage 33.

The exhaust manifold 31 includes four independent exhaust passages to be connected to the exhaust ports 4 of the cylinders 2, and a collecting passage formed by merging the downstream ends of the independent exhaust passages. The upstream end of the common exhaust passage 33 is connected to the downstream end of the collecting passage in the exhaust air flow direction.

A turbine wheel 41 (hereinafter, referred to as a second turbine 41) of the second exhaust turbocharger 15, a turbine wheel 40 (hereinafter, referred to as a first turbine 40) of the first exhaust turbocharger 11, an exhaust purification device 34, and an exhaust shutter valve 37 are disposed in this order on the common exhaust passage 33 from the upstream side in the exhaust air flow direction. The exhaust shutter valve 37 is controllably opened and closed by the ECU 100.

The exhaust purification device 34 has a catalytic function, and a function of trapping exhaust particulates (PM) of diesel smoke. Specifically, the exhaust purification device 34 includes an oxidation catalyst 35, and a diesel particulate filter (DPF) 36 disposed on the downstream side of the oxidation catalyst 35.

As illustrated in FIG. 1, the first exhaust turbocharger 11 and the second exhaust turbocharger 15 are disposed between the common intake passage 13 and the common exhaust passage 33. Two-stage supercharging is performed by the first exhaust turbocharger 11 and the second exhaust turbocharger 15. Note that when the electric supercharger 18 is driven, three-stage supercharging in total is performed.

The first exhaust turbocharger 11 includes the first turbine 40 which is driven to rotate by energy of exhaust gas, and the first compressor 43 connected to the first turbine 40 via a shaft 42. The first exhaust turbocharger 11 supercharges intake air by rotation of the first compressor 43, which is associated with rotation of the first turbine 40.

The second exhaust turbocharger 15 includes the second turbine 41 which is driven to rotate by energy of exhaust gas, and the second compressor 44 connected to the second turbine 41 via a shaft 45. The second exhaust turbocharger 15 supercharges intake air by rotation of the second compressor 44, which is associated with rotation of the second turbine 41.

Further, as illustrated in FIG. 1, a low-pressure EGR passage (LP-EGR passage) 50, and a high-pressure EGR passage (HP-EGR passage) 60 are formed between the intake passage 12 and the exhaust air passage 30.

The LP-EGR passage 50 communicates between the downstream portion of the common exhaust passage 33 with respect to the exhaust purification device 34 in the exhaust air flow direction, and the upstream portion of the the common intake passage 13 with respect to the first compressor 43 in the intake air flow direction; and refluxes a part of exhaust gas of a relatively low pressure, which is obtained after the first turbine 40 and the second turbine 41 are driven, to the intake passage 12. An LP-EGR valve 51 is disposed on the LP EGR passage 50. Opening and closing of the LP-EGR valve 51 is controlled by the ECU 100. Further, an LP-EGR cooler 52 is disposed on the upstream side of the LP-EGR valve 51 in the exhaust air flow direction.

The-HP EGR passage 60 communicates between the upstream portion of the common exhaust passage 33 with respect to the second turbine 41 in the exhaust air flow direction, and a surge tank 9; and refluxes a part of exhaust gas of a relatively high temperature and a relatively high pressure, which is obtained before the first turbine 40 and the second turbine 41 are driven, to the intake passage 12. An HP-EGR valve 61 is disposed on the HP-EGR passage 60. Opening and closing of the HP-EGR valve 61 is controlled by the ECU 100. Further, an HP-EGR cooler 62 is disposed on the upstream side of the HP-EGR valve 61 in the exhaust air flow direction. Furthermore, an EGR bypass passage 20 which bypasses the HP-EGR valve 61 and the HP-EGR cooler 62 is connected to the HP-EGR passage 60. An EGR bypass valve 22 is disposed on the EGR bypass passage 20. Opening and closing of the EGR bypass valve 22 is controlled by the ECU 100.

The ECU 100 is a microcomputer constituted by a CPU, an RAM, and an ROM. The ECU 100 is configured to control components to be controlled by control signals to be generated by a program, which is stored in advance in the ROM.

The ECU 100 is connected to a plurality of sensors which detect operating states of a vehicle including a crank angle and a stepping amount of an accelerator pedal via a communication line. The ECU 100 receives a signal indicating an operating state of a vehicle from each of the sensors through the communication line. The ECU 100 generates control signal for controlling the first flow rate regulator valve 17, the second flow rate regulator valve 19, the electric supercharger 18, the EGR bypass valve 22, the exhaust shutter valve 37, the HP-EGR valve 61, the LP-EGR valve 51, and the like on the basis of input signals. The ECU 100 is connected to the first flow rate regulator valve 17, the second flow rate regulator valve 19, the electric supercharger 18, the EGR bypass valve 22, the exhaust shutter valve 37, the HP-EGR valve 61, the LP-EGR valve 51, and the like via a communication line. The ECU 100 transmits control signals to these components to be controlled through the communication line (see the broken line arrows in FIG. 1).

It is possible to change the opening angle of one of the first flow rate regulator valve 17 and the second flow rate regulator valve 19, which is opened, according to a stepping amount of the accelerator pedal or the like. In other words, the first flow rate regulator valve 17 has a function of closing the intake passage 12, and a function as a throttle valve which controls the amount of intake air by changing the passing area of intake air. Likewise, the second flow rate regulator valve 19 has a function of closing the electric supercharger bypass passage 21, and a function as a throttle valve which controls the amount of intake air by changing the passing area of intake air.

Advantageous Effects of Embodiment

According to the embodiment, as illustrated in FIG. 5, the downstream end of the intercooler 16 in the intake air flow direction is located on the lower end of the intercooler 16. The downstream end of the intercooler 16 is disposed substantially at the same height as the upstream end of the intake ports 3. Further, the upstream ends of the intake ports 3 and the downstream end of the intercooler 16 are communicated via the intake manifold 10 which is disposed substantially horizontally. According to this configuration, even if water droplets are generated within the intercooler 16 by water condensation in cooling high temperature intake air discharged from the electric supercharger 18 by the intercooler 16, and the water droplets drop onto the lower end (the bottom plate portion 16c2) of the intercooler 16, the water droplets are smoothly sucked into the intake ports 3 through the intake manifold 10 immediately after dropping. This makes it possible to prevent deposition of condensed water within the intercooler 16. Therefore, it is possible to prevent that deposited condensed water may be instantaneously sucked into the intake ports 3 when the engine speed is increased, thereby adversely affecting the engine.

Further, the lower end of the intercooler 16 is disposed substantially at the same height as the upstream end of the intake ports 3. This makes it possible to dispose the intercooler 16 at a relatively low position. This is advantageous in suppressing the height of a hood 72 (see FIG. 5) at a relatively low height.

Further, the electric supercharger 18 is disposed below the intercooler 16 along the surface 25 of the engine 1 on the intake side. This makes it possible to mount the electric supercharger 18 around the engine 1 in a compact manner by effectively using a space below the intercooler 16, while suppressing influence of exhaust heat on the electric supercharger 18.

Further, according to the embodiment, the main intake pipe 13c extends from the compressor 43 of the first exhaust turbocharger 11, extends from the exhaust side of the engine 1 toward the intake side of the engine 1 along an end of the engine 1 in the cylinder array direction (the rear end of the engine 1 in the vehicle front-rear direction), and further extends toward the intercooler 16 along the surface 25 of the engine on the intake side. This makes it possible to dispose the main intake pipe 13c at a relatively low position, while preventing interference of the main intake pipe 13c with a component projecting from the upper surface of the engine 1 e.g. a rear end of an injector. This is advantageous in suppressing the height of the hood 72 at a relatively low height. Further, the electric supercharger bypass passage 21, which is branched from the first position 13a at a midway of the main intake pipe 13c, passes the electric supercharger 18, and is connected to the second position 13b at a midway of the main intake pipe 13c, is disposed along the surface 25 of the engine 1 on the intake side. This makes it possible to dispose the electric supercharger bypass passage 21 together with the electric supercharger 18 around the engine 1 in a compact manner.

Further, according to the embodiment, the main intake pipe 13c extends from the exhaust side of the engine 1 toward the intake side of the engine 1 upwardly toward the intercooler 16. The first position 13a at which the electric supercharger bypass passage 21 is branched is set at a portion of the main intake pipe 13c extending upwardly from the end of the engine 1 in the cylinder array direction (the rear end of the engine 1 in the vehicle front-rear direction). According to this configuration, it is possible to branch the electric supercharger bypass passage 21 (21a) relatively moderately from the main intake pipe 31c, and to cause intake air to smoothly flow from the main intake pipe 13c to the electric supercharger bypass passage 21.

Further, according to the embodiment, the first flow rate regulator valve 17 is disposed on the main intake pipe 13c between the first position 13a and the second position 13b. This makes it possible to dispose the first flow rate regulator valve 17 while securing a relatively large space between the first position 13a and the second position 13b.

Further, according to the embodiment, the second flow rate regulator valve 19 is disposed on the electric supercharger bypass passage 21 at a position above the electric supercharger 18 and below the intercooler 16. This makes it possible to dispose the second flow rate regulator valve 19 together with the electric supercharger 18 around the engine 1 in a compact manner by effectively using a space below the intercooler 16.

Further, according to the embodiment, the bottom plate portion 16c2 of the intercooler 16, specifically, the lower surface of the intercooler 16 extends obliquely upwardly from an end of the intercooler 16 on the intake manifold side toward an end of the intercooler 16 on the side opposite to the intake manifold. This is advantageous in securing a large space below the intercooler 16, and in facilitating mounting the electric supercharger 18 and the like.

Further, according to the embodiment, the inside of the engine room is separated into the region R1 where the engine 1 and the supercharging device are disposed, and the region R2 where the vehicle-mounted electrical component 75 such as a BCM or a battery is disposed by the partition wall 74. This makes it possible to prevent heat generated in the engine 1 from adversely affecting the vehicle-mounted electrical component 75, and to promote a warm-up operation of the engine 1 at the start of the engine 1 by suppressing dissipation of heat generated in the engine 1.

Note that the embodiment may be modified as follows. For instance, one of the first exhaust turbocharger 11 and the second exhaust turbocharger 15 may be omitted.

Further, the number of cylinders of the engine 1 may be changed to the number other than the above. Further, in the embodiment, the present invention is applied to a diesel engine. Alternatively, the present invention may be applied to a gasoline engine.

The following is a summary of the embodiments of the present invention.

In order to solve the aforementioned drawbacks, the present invention provides a supercharging device for an engine including a cylinder head with intake ports. The supercharging device includes an electric supercharger which supercharges intake air to the engine; an intercooler which cools intake air discharged from the electric supercharger; and an intake manifold which is disposed substantially horizontally, and is configured to communicate between a downstream end of the intercooler in an intake air flow direction, and the intake ports. The downstream end of the intercooler is located on a lower end of the intercooler, and the downstream end of the intercooler is disposed substantially at the same height as an upstream end of the intake ports. The electric supercharger is disposed below the intercooler along a surface of the engine on an intake side where the intake ports are opened.

According to the present invention, the downstream end of the intercooler is located on a lower end of the intercooler. The downstream end of the intercooler is disposed substantially at the same height as the upstream end of the intake ports. Further, the intake ports and the downstream end of the intercooler are communicated with each other by the substantially horizontally disposed intake manifold. According to this configuration, even if water droplets are generated within the intercooler by water condensation in cooling high temperature intake air discharged from the electric supercharger by the intercooler, and the water droplets drop onto the lower end of the intercooler, the water droplets are smoothly sucked into the intake ports through the intake manifold immediately after dropping. This makes it possible to prevent deposition of condensed water within the intercooler. Therefore, it is possible to prevent that deposited condensed water may be instantaneously sucked into the intake ports when the engine speed is increased, thereby adversely affecting the engine.

Further, the lower end of the intercooler is disposed substantially at the same height as the upstream end of the intake ports. This makes it possible to dispose the intercooler at a relatively low position. This is advantageous in suppressing the height of a hood at a relatively low height.

Furthermore, the electric supercharger is disposed below the intercooler along the surface of the engine on the intake side. Therefore, it is possible to dispose the electric supercharger around the engine in a compact manner by effectively using a space below the intercooler, while suppressing influence of exhaust heat on the electric supercharger.

In the present invention, preferably, the supercharging device may further include a turbocharger which is disposed along a surface of the engine on an exhaust side, and is configured to be driven by exhaust gas of the engine; a main intake pipe which extends from a compressor of the turbocharger, extends from the exhaust side of the engine toward the intake side of the engine along an end of the engine in a cylinder array direction, and further extends toward the intercooler along the surface of the engine on the intake side; and a branch intake pipe which is branched downward from a first position at a midway of the main intake pipe, passes the electric supercharger, and is disposed along the surface of the engine on the intake side, a downstream end of the branch intake pipe being connected to a second position of the main intake pipe on a downstream side than the first position.

According to the aforementioned configuration, the main intake pipe extends from the compressor of the turbocharger, extends from the exhaust side of the engine toward the intake side of the engine along the end of the engine in the cylinder array direction, and further extends toward the intercooler along the surface of the engine on the intake side. This makes it possible to dispose the main intake pipe at a relatively low position, while preventing interference of the main intake pipe with a component projecting from the upper surface of the engine e.g. a rear end of an injector. This is advantageous in suppressing the height of the hood at a relatively low height. Further, the branch intake pipe, which is branched from the first position at a midway of the main intake pipe, passes the electric supercharger, and is connected to the second position at a midway of the main intake pipe, is disposed along the surface of the engine on the intake side. This makes it possible to dispose the branch intake pipe together with the electric supercharger around the engine in a compact manner.

In the present invention, preferably, the main intake pipe may extend from the exhaust side of the engine toward the intake side of the engine upwardly toward the intercooler, and the first position may be located at a portion of the main intake pipe extending upwardly from the end of the engine in the cylinder array direction.

According to the aforementioned configuration, it is possible to branch the branch intake pipe relatively moderately from the main intake pipe, and to cause intake air to smoothly flow from the main intake pipe to the branch intake pipe.

In the present invention, preferably, the supercharging device may further include a first flow rate regulator valve which is disposed on the main intake pipe between the first position and the second position, and is configured to regulate a flow rate of intake air to be introduced to the intake ports through the main intake pipe.

According to the aforementioned configuration, it is possible to dispose the first flow rate regulator valve while securing a relatively large space between the first position and the second position.

In the prevent invention, preferably, the supercharging device may further include a second flow rate regulator valve which is disposed on the branch intake pipe at a position above the electric supercharger and below the intercooler, and is configured to regulate a flow rate of intake air to be introduced to the intake ports through the branch intake pipe.

According to the aforementioned configuration, it is possible to dispose the second flow rate regulator valve together with the electric supercharger around the engine in a compact manner by effectively using a space below the intercooler.

In the present invention, preferably, a lower surface of the intercooler may extend obliquely upwardly from an end of the intercooler on an intake manifold side toward an end of the intercooler on a side opposite to the intake manifold.

The aforementioned configuration is advantageous in securing a large space below the intercooler, and in facilitating mounting an electric supercharger or the like.

In the present invention, preferably, the engine may be a longitudinally mounted engine which is disposed in such a manner that the cylinder array direction is aligned with a vehicle front-rear direction, and the supercharging device may further include a partition wall which separates the inside of an engine room into a region where the engine and the supercharging device are disposed, and a region where a vehicle-mounted electrical component is disposed.

According to the aforementioned configuration, the inside of the engine room is separated into the region where the engine and the supercharging device are disposed, and the region where the vehicle-mounted electrical component is disposed by the partition wall. This makes it possible to prevent heat generated in the engine from adversely affecting the vehicle-mounted electrical component, and to promote a warm-up operation of the engine at the start of the engine by suppressing dissipation of heat generated in the engine.

This application is based on Japanese Patent Application No. 2016-024868 filed in Japan Patent Office on Feb. 12, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A supercharging device for an engine including a cylinder head with intake ports, comprising:
    an electric supercharger which supercharges intake air to the engine;
    an intercooler which cools intake air discharged from the electric supercharger; and
    an intake manifold disposed substantially horizontally, and configured to communicate between a downstream end of the intercooler in an intake air flow direction, and the intake ports, wherein
    the downstream end of the intercooler is located on a lower end of the intercooler, and the downstream end of the intercooler is disposed substantially at a same height as an upstream end of the intake ports, and
    the electric supercharger is disposed below the intercooler along a surface of the engine on an intake side where the intake ports are opened.

2. The supercharging device for an engine according to claim 1, further comprising:
    a turbocharger which is disposed along a surface of the engine on an exhaust side, and is configured to be driven by exhaust gas of the engine;
    a main intake pipe which extends from a compressor of the turbocharger, extends from the exhaust side of the engine toward the intake side of the engine along an end of the engine in a cylinder array direction, and further extends toward the intercooler along the surface of the engine on the intake side; and
    a branch intake pipe which is branched downward from a first position at a midway of the main intake pipe, passes the electric supercharger, and is disposed along the surface of the engine on the intake side, a downstream end of the branch intake pipe being connected to a second position of the main intake pipe on a downstream side than the first position.

3. The supercharging device for an engine according to claim 2, wherein
    the main intake pipe extends from the exhaust side of the engine toward the intake side of the engine upwardly toward the intercooler, and
    the first position is located at a portion of the main intake pipe extending upwardly from the end of the engine in the cylinder array direction.

4. The supercharging device for an engine according to claim 2, further comprising:
    a first flow rate regulator valve which is disposed on the main intake pipe between the first position and the second position, and is configured to regulate a flow rate of intake air to be introduced to the intake ports through the main intake pipe.

5. The supercharging device for an engine according to claim 2, further comprising:
    a second flow rate regulator valve which is disposed on the branch intake pipe at a position above the electric supercharger and below the intercooler, and is configured to regulate a flow rate of intake air to be introduced to the intake ports through the branch intake pipe.

6. The supercharging device for an engine according to claim 1, wherein
    a lower surface of the intercooler extends obliquely upwardly from an end of the intercooler on an intake manifold side toward an end of the intercooler on a side opposite to the intake manifold.

7. The supercharging device for an engine according to claim 1, wherein
    the engine is a longitudinally mounted engine which is disposed in such a manner that the cylinder array direction is aligned with a vehicle front-rear direction, and
    the supercharging device further includes a partition wall which separates the inside of an engine room into a region where the engine and the supercharging device are disposed, and a region where a vehicle-mounted electrical component is disposed.

* * * * *